(12) United States Patent
MacLeod (10) Patent No.: US 7,938,372 B2
(45) Date of Patent: May 10, 2011

(54) FREE STANDING OR VEHICLE MOUNTED 6-AXIS POSITIONABLE TRAY, POSITIONABLE SHELF, CUP-HOLDER, STANCHION APPARATUS AND RELATED SYSTEMS

(75) Inventor: Edward N. MacLeod, Westford, MA (US)

(73) Assignee: MTI Research Corporation, Trenton, ME (US)

( * ) Notice: Subject to any disclaimer, the term of this patent is extended or adjusted under 35 U.S.C. 154(b) by 1141 days.

(21) Appl. No.: 11/059,928

(22) Filed: Feb. 18, 2005

(65) Prior Publication Data

US 2006/0278770 A1 Dec. 14, 2006

Related U.S. Application Data

(63) Continuation-in-part of application No. 09/946,207, filed on Sep. 6, 2001, now abandoned.

(51) Int. Cl.
*A47F 5/00* (2006.01)
(52) U.S. Cl. ............... 248/122.1; 248/124.1; 248/124.2; 248/276.1; 108/10
(58) Field of Classification Search ............... 248/122.1, 248/124.1, 124.2, 125.7, 125.9, 276.1, 278.1, 248/281.11, 284.1, 285.1, 286.1, 287.1, 370, 248/371, 177.1, 178.1, 179.1, 183.1, 183.2; 108/10; 211/131.1, 187
See application file for complete search history.

(56) References Cited

U.S. PATENT DOCUMENTS

| 2,111,903 | A | * | 3/1938 | Rona | 378/178 |
| 2,598,529 | A | * | 5/1952 | Fritz | 248/457 |
| 2,767,003 | A | * | 10/1956 | Gilmont | 403/385 |
| 3,498,471 | A | * | 3/1970 | Dirkx | 211/131.1 |
| 5,188,424 | A | * | 2/1993 | Herron | 297/195.1 |
| 5,630,566 | A | * | 5/1997 | Case | 248/122.1 |
| 5,931,102 | A | * | 8/1999 | Grahl | 108/42 |
| 5,975,500 | A | * | 11/1999 | Orton et al. | 256/19 |
| 6,079,681 | A | * | 6/2000 | Stern et al. | 248/278.1 |
| 6,357,611 | B1 | * | 3/2002 | Chen | 211/187 |
| 6,390,424 | B1 | * | 5/2002 | Kidushim et al. | 248/122.1 |
| 6,505,988 | B1 | * | 1/2003 | Oddsen, Jr. | 403/110 |
| 6,796,536 | B1 | * | 9/2004 | Sevier, IV | 248/121 |
| 6,884,185 | B2 | * | 4/2005 | Udwin et al. | 473/417 |

* cited by examiner

*Primary Examiner* — Anita M King
(74) *Attorney, Agent, or Firm* — Elmore Patent Law Group, P.C.; Carolyn S. Elmore (57) ABSTRACT

An apparent need exists for compact devices to ergonomically support such items as laptop computers, keyboards and projectors. The AIRDESK® desk/stand design positions such items with full 3D positioning using all 6 directions of adjustment. Each direction of motion has the correct friction and range of motion for easy and secure re-positioning. Unique accessory shelves and cup holder may be attached to the device frame. A unique, flat, very thin, trip-free base provides unparalleled positioning flexibility of the unit, furniture legs may be placed directly on the base sheet. Additionally, a unique universal and quickly installed folding frame for an automobile or truck seat is provided for supporting the AirDesk positionable tray in a vehicle. AirDesks allow computing from any chair, recliner, sofa, bed, while standing or in a vehicle. The unique trip-free base may also be used for such applications as supporting medical equipment and crowd control stanchions.

17 Claims, 13 Drawing Sheets

FREE STANDING OR VEHICLE MOUNTED 6-AXIS POSITIONABLE TRAY, POSITIONABLE SHELF, CUP-HOLDER, STANCHION APPARATUS AND RELATED SYSTEMS

RELATED APPLICATION

This application is a continuation-in-part of U.S. application Ser. No. 09/946,207, filed on Sep. 6, 2001, which is now abandoned and is incorporated herein by reference.

BACKGROUND OF THE INVENTION

A compact apparatus that easily and comfortably positions such items as a compact computer, computer keyboard, computer accessories, reading material, projector or medical equipment is needed that can allow freedom of motion of the user and precise positioning of the item and that can be used with or near traditional furniture such as chairs, sofas, recliners, vehicle seats and beds. Additional benefits to users for a fully adjustable supporting or positioning device may be increased ergonomic comfort and living space economy.

Pre-existing desks or supports do not universally work well with traditional chairs, sofas, beds or recliners. Such device's wheels, legs and or supporting structures prohibit easy positioning of the supported device in many situations. Limited degrees of freedom of the prior art also reduce user comfort when working on or with the supported item. Such devices are complicated to assemble and are not readily disassembled for storage or shipping. Prior art devices, are frequently awkward to use when standing, sitting, or when reclined. Typically, such devices are prohibitively large and cumbersome and need a large floor area to operate as designed. These drawbacks make them inconvenient or unsuitable for many user environments. Airdesks.

There also exists the need for a portable, easily installed, ergonomically positionable, table for use in vehicles. The apparatus should be vehicle independent, install quickly and securely and the tray should be adjustable in 6 axis for comfortable use with such items as a computer, GPS or reading/writing material. Pre-existing apparatus typically, require vehicle modifications and must be permanently installed in a vehicle, rapid transfer from vehicle to vehicle or for storage is not possible.

An additional need exists for a low-cost video projector mounting apparatus that provides projector positioning in up to 6 degrees of freedom for achieving accurate projected image geometry. Such a device should also be able to position the projector above head level to minimize shadows from passers by and nearby furniture. Prior art apparatus typically consists of permanent, ceiling-mounted projectors or simple table top mounts. Prior art projector holders are typically obtrusive, frequently impractical to implement and often aesthetically undesirable. Ideally this device will have a movable base with a near zero apparent footprint.

A need also exists for an apparatus to mount medical or scientific equipment in up to 6 axis for ease of use and viewing as well as economy of work space. Ideally the device can be used to simultaneously mount and independently position multiple instruments. Ideally this apparatus will be movable and have a near zero apparent footprint.

A need also exists for a portable positionable tray mounting system having a minimal apparent footprint for use in home and medical environments where space is at a premium.

A need also exists for portable, near zero apparent footprint, easily manufactured, movable crowd control barrier stanchion as may be used in an airport queue, where the stanchion base does not to present a trip hazard and will not act as a barrier to wheeled baggage. Such an apparatus can substantially reduce turn radii on corners, and isle width, substantially reclaiming high value floor space over prior-art thick base and conical base stanchions. Ideally such a devise would allow stacking of the base for storage or shipping.

A need also exists for a universal and inexpensive cup holder, capable of holding any personal beverage container including soda can, bottle, drinking glass, and any mug with a handle. This apparatus should require no adjustment and be readily adaptable to conventional cup holder applications.

SUMMARY OF THE INVENTION

1) The new device termed an AirDesk® allows the user to easily position such items as a compact computer, keyboard or book for optimal comfort. The compact, ergonomic, 6 degrees of freedom design allows optimal item positioning for almost any user environment. The unique swing-away design allows easy standing and sitting when used seated and offers convenient routing for cables.
2) In the free standing, portable, floor configuration, the unique thin, flat AirDesk base is able to fit under any office style chair castor or furniture leg allowing comfortable use from any chair, sofa, recliner or bed. This unique base is trip-free and produces a minimal apparent footprint relative to passers-by and furniture and also allows the supporting structure to be positioned closer to the user allowing a shorter cantilever resulting in a more compact, more rigid structure with more placement options. Additionally but not necessarily, the thin base may be positioned under surrounding furniture legs or wheels adding additional apparent weight to the already weighted base, resulting in increased stability of the cantilevered structure. Additionally the upright member of the design is an ideal support for a variety of items such as shelves, cup holder, note holders, speaker holder, lamp and mouse pad attachment.
3) The AirDesk base, mast and adjustable table design can be used to mount video projectors where the 6 axis range of motion adjustability and compactness is ideally suited for home theater style projectors using either the free standing base or permanently installed mast affixed to either or both the floor and ceiling.
4) In the AirDesk configuration for vehicular use, a compact, unique, portable base clamps between any vehicle's seat bottom and seat back to a provide rapid, secure and vehicle independent installation of the AirDesk's ergonomic table positioning apparatus.
5) As a shelf accessory attached to an AirDesk mast or as a stand alone device, or as an integral modification to an existing device such as a vehicle console, a cup holder consisting of a flat base with four flexible upright rubber fingers with approximate finger to finger spacing of 70 mm provides a most effective and low cost universal cup, mug, glass, can or bottle holder. The rubber fingers flex to adapt and grip larger non cylindrical containers but are stiff enough to hold smaller cylindrical containers such as 12 oz soda cans. Prior art cup holder designs fail to provide the same universal cup fit or they require more complex and expensive mechanical adaptation means. Up to 8 fingers may be used, however only four are necessary if the finger diameter of approximately 14 mm is used.

6) The upright mast with the unique AirDesk sheet metal base provides a trip-free zone and near-zero footprint relative to pedestrians and such items as rolling luggage, making it well suited for such applications as a support for crowd control barrier stanchions. The unique base provides cost, appearance, and functionality benefits not available with prior art base designs. Prior art stanchion bases are all thick (approximately 1.5 inches (37 mm)) by design and frequently hollow plastic to allow for pea gravel ballast or formed sheet metal to enclose thick cast iron weights. Use of a thick base is a trip hazard, impedes pedestrian traffic and is an obstacle to wheeled baggage and carts, back-and-forth style barricades require wider turn areas and wider isles to provide adequate walking space around and between the thick bases, this wastes valuable floor space and increases the potential for single file or double file confusion for users. The free standing AirDesk base, when used as a stanchion base, allows significantly narrower isles and turn areas when used as a base for conventional crowd control barrier stanchions, use of a larger diameter base allows more tip over stability with less total weight.

7) Unlike the AirDesk base, prior art stanchion bases try to use a small diameter base in an attempt to minimize floor space consumption, thus they must use more base weight to achieve a stable platform with the smaller base diameter. The AirDesk stanchion base can use a larger base diameter without posing a trip hazard and is able to provide the same or greater anti tip over stability with less overall weight.

8) Prior art stanchion bases are thicker, heavier, made of both weight and shell components and usually irregular in cross section, they require more storage space when not in use. AirDesk bases may be tightly stacked when disassembled for shipment or storage thus consuming much less space, they are more economical to ship than prior art stanchion bases.

9) Adding multiple masts to the free standing AirDesk sheet base provides controlled stanchion positioning for such items as crowd control barriers where, for example, two uprights make an entry or exit gate. Persons simply walk through the gate over the unobtrusive, thin, sheet base.

10) By adding a puzzle or dovetail like interlocking cut to the free standing AirDesk base perimeter, multiple bases can be interlocked providing a dimensionally controlled and immovable foundation for large dimensionally controlled barrier arrays.

11) By rigidly attaching two upright masts, at for example 18" (460 mm) apart, to the unique thin base sheet and by spanning the uprights by one or more shelve elements, a useful and portable desk/stand/table is produced combining the previously described benefits of the near zero footprint AirDesk base with an adjustable height table top or shelves. In addition to the aforementioned benefits of the near zero footprint AirDesk base, The resulting apparatus is more compact, portable, aesthetically attractive, readily assembled/disassembled and consumes less volume when broken down for storage or shipping than prior art devices typically having four legs and or large base structures.

12) The apparatus as described in 11 is particularly well suited as a compact computer workstation when the main shelf spanning two upright masts is height adjustable and supports a monitor and one or more height adjustable shelves below support keyboard and mouse. Prior art workstations have much large apparent footprints and are substantially bulkier, less portable, consume substantially more valuable living space, are heavier, use more material, are more complex to manufacture, are more complicated to assemble and disassemble, and are typically less adjustable than the AirDesk Desktop™ desk.

13) A commercially successful configuration of the apparatus described in 12 is to place a computer monitor on the top shelf and add two AirDesk 6 axis positionable tables for ergonomically positioning keyboard and mouse input devices, one on each upright mast. The resulting workstation is more compact, portable, ergonomically beneficial, aesthetically attractive, far more adjustable, easier to assemble/disassemble and transport than prior art computer workstations.

DRAWING DESCRIPTIONS

FIGS. 4 A and B show a section views of A-A as called out from FIG. 2 and depicts the tilt adjustment relationship between hand screw and arm cam.

DETAILED DESCRIPTION OF THE INVENTION

The Free Standing Base (1)

Figure 1:
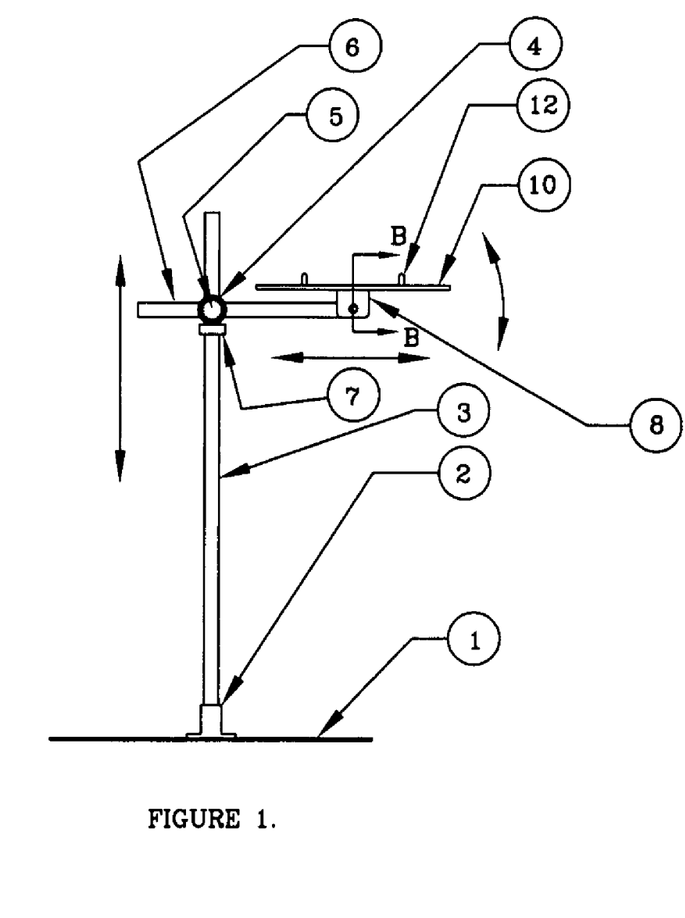
FIG. 1 shows a typical front side view of the freestanding, single mast version of the device along with 3 of the 6 axis of motion.
Figure 2:
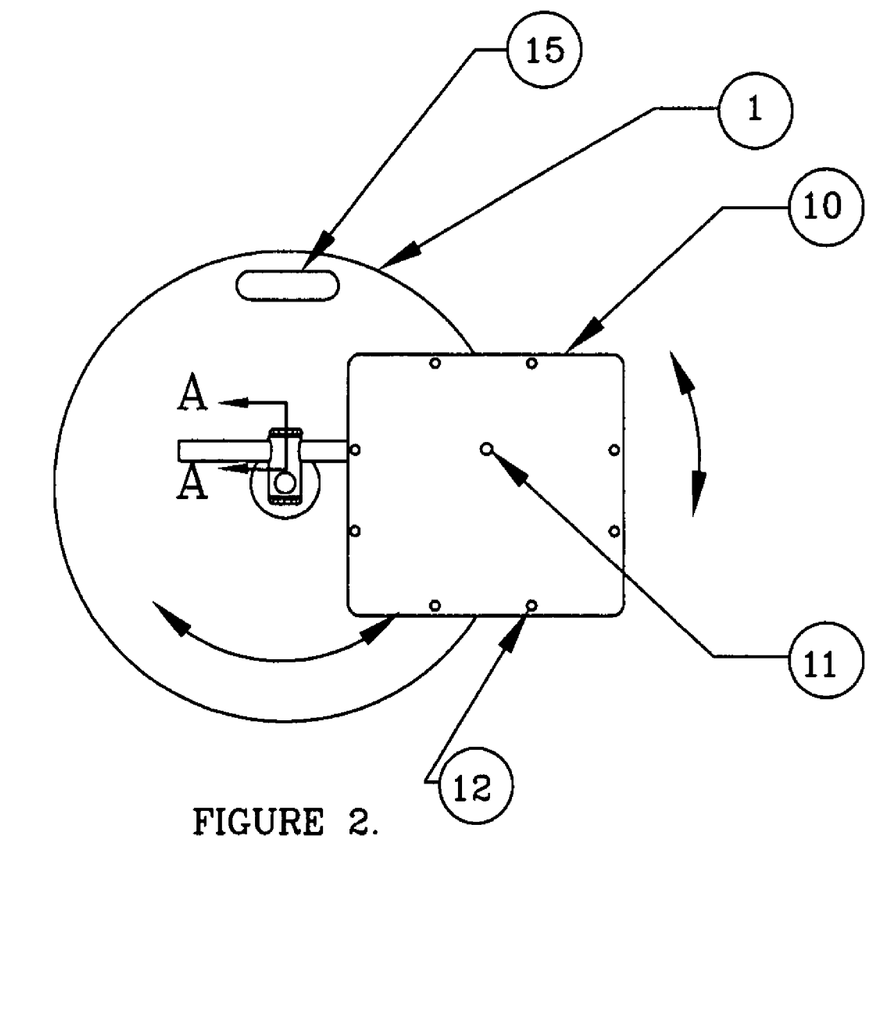
FIG. 2 shows a typical top view of the freestanding, single mast device configuration and 2 of the 6 axis of motion.
Figure 3:
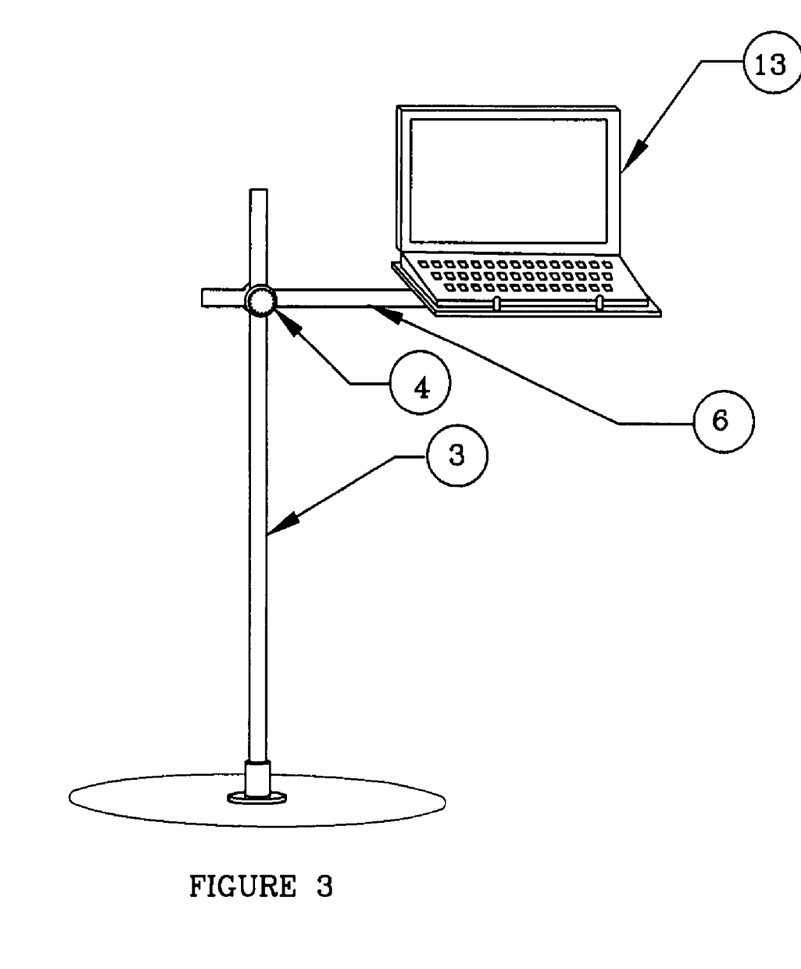
FIG. 3 shows a typical isometric view of the device showing a partial view of the castored legs of a typical office chair. This view also shows typical positioning of a typical laptop or notebook computer.

At the bottom of the device there is a unique flat but structurally adequate base (1) shown in FIGS. 1, 2, 3 and 5. This base may be round or any other shape of adequate geometry to support the cantilevered load by acting as a fulcrum (at the outer edge of the base) and as a counter weight to the cantilevered load. Steel sheet stock is used for weight and stiffness and economy, however other materials with similar properties may be used. Typically the thickness of the base sheet is less than ¼" (6 mm) with approximately 0.12" (3 mm) thick being well suited for use near wheeled furniture, luggage wheels, pedestrian traffic or for placement under chairs, recliners, sofas or conventional desks. As depicted in FIG. 3, office chair castors easily roll over the base without a noticeable interruption to the rolling motion of the chair, both on carpeted and uncarpeted floors. Rigid leg furniture also shows no noticeable tilt when one or two legs are positioned on the base. Optionally the base sheet may be cut with a handle (15) for added portability Base Fitting (2)

A sturdy fitting may be is used to connect the mast (3) to the base sheet (1) as shown in FIGS. 1, 2 and 3. This fitting retains the mast in a close fitting socket or internal plug design. For easy disassembly, assembly and portability, said fitting may contain setscrew(s) or pin(s) or threads to retain the mast tube. This fitting may be attached to the base(1) by conventional attachment means or this fitting may also be conventionally attached directly to a table top or under an overhead counter to provide the function of vertically supporting the mast tube (3) at the desired work area.

Mast (3)

The mast (3) may be of solid or tubular construction and is typically made of steel for strength, however other materials of similar structural performance may be used. When fitted with a cross fitting (4), a round cross section is best and a polished finish is preferred on the mast to allow the smooth adjustments of cantilever arm height and rotation about the mast. Said mast is of sufficient height to properly position the supported item in the intended user environments.

Cross Fitting (4)

Figure 4A:
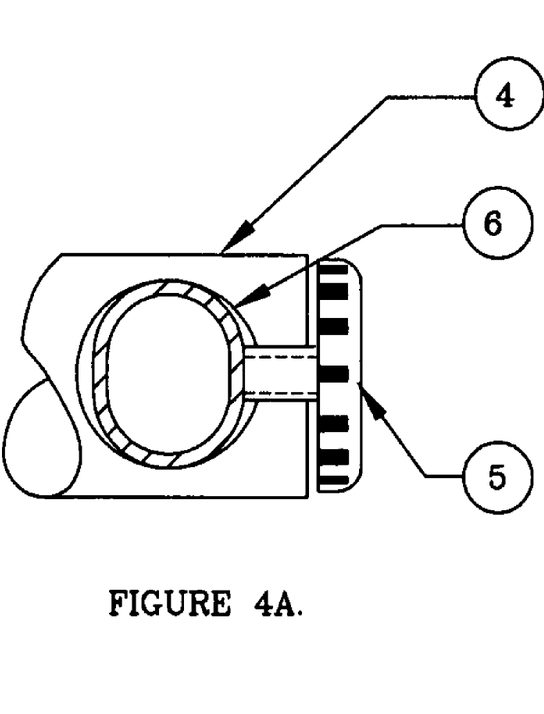
Figure 4B:
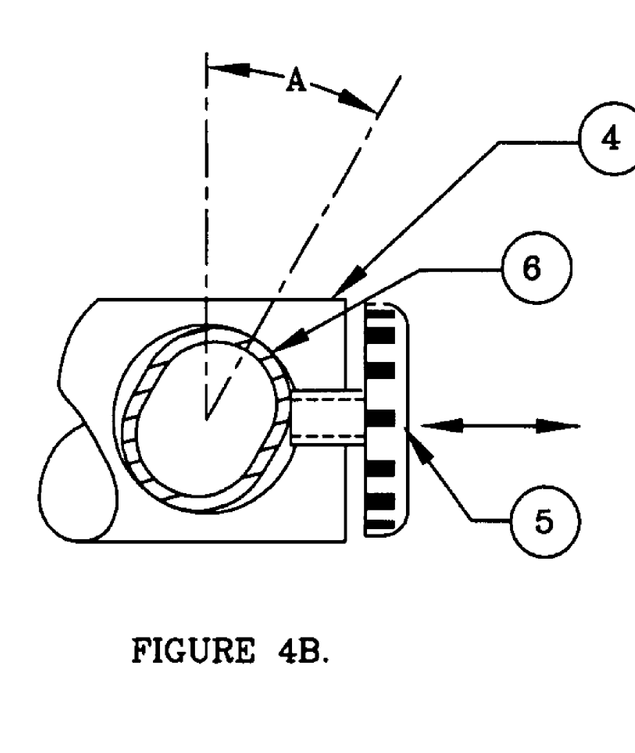

Perpendicularly attached to the mast at a right angle is a unique cross fitting (4) as depicted in FIGS. 1, 2, 3, 4, and 5. Round, square, rectangular or other cross-sections of adequate girth may be used. This fitting is may be made of any material of sufficient strength to support the cantilevered arm. Two holes pass through this fitting at approximately right angles to each other. One hole goes around the mast (3) and a second hole goes around the cantilevered arm (6). Two thumb or hand screws (5), one on each end, of this fitting tighten to clamp the mast (height and rotation friction control) and cantilever arm horizontal position and rotation limit adjustment. The rotation limit adjustment technique is depicted in FIG. 4 where by tightening or loosening hand screw (5), rotation of the cantilevered arm (6) and the subsequent tilt of the supported device may be adjusted. Sections A-A, FIGS. 4A and 4B, shows a unique hand screw (5) adjustable tilt limiting connection between the cantilevered arm (6) and the cross fitting (4). An oval shape cross-section of the cantilevered arm prevents the platform from tipping excessively. Adjusting the clamping hand screw (5) allows the adjustment of the rotation of the cantilevered arm and thus the tilt of the supported table (10). This adjustment is especially well suited to help the positioning of a computer keyboard device, a desirable feature for typing comfort. An oval cross-section works well, however other cam shaped cross-sections, such as a square, may be used to achieve similar, if functionally inferior, adjustable tilt results.

Support Collar (7)

Figure 5:
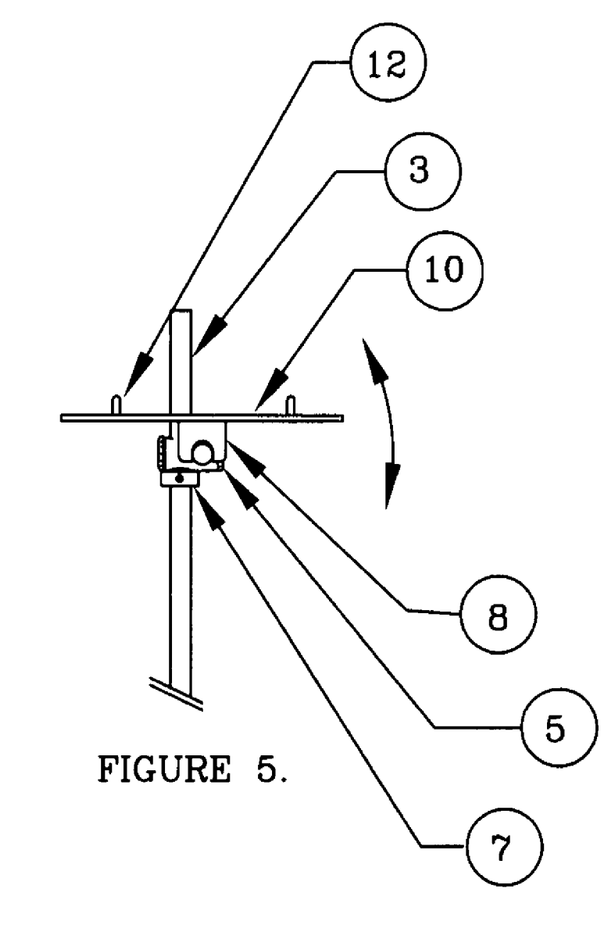
FIG. 5 is at 90 degrees relative to FIG. 1 and shows a side view of the upper portion of the device and shows one of the 6 axis of motion.

As the cantilevered arm (6) is swiveled around the mast, there will be a tendency for cross fitting (4) to gradually slide down the mast (3) as seen in FIGS. 1 and 5. A conventional support collar (7) having a setscrew or other conventional shaft collar retaining means, may be is used to prevent the cross fitting (4) from sliding down.

Cantilevered Arm (6)

The cantilevered arm (6) extends through the cross fitting (4) and supports the table payload. Attached at the end of this arm is a pivoting hub (7). The cantilevered arm is typically tubular steel with an approximately oval, square, semi-circular or "D" cross section such that tightening or loosening the hand screw on the cross fitting will adjust the allowable rotation position of the cantilevered arm along the arms length, this helps to make the platform tilt limited and tilt adjustable.

Typically this arm is of a hard polished material such as polished steel tube. The hole in the cross fitting (4) that accepts the cantilevered arm is large enough to allow the arm to slide freely with the hand screw loose but small enough to rigidly support the arm. Near the end of the cantilevered arm is a cross hole through which a machine screw (9) passes through, about which the platform hub pivots and is supported.

Pivoting Hub (8)

Figure 6:
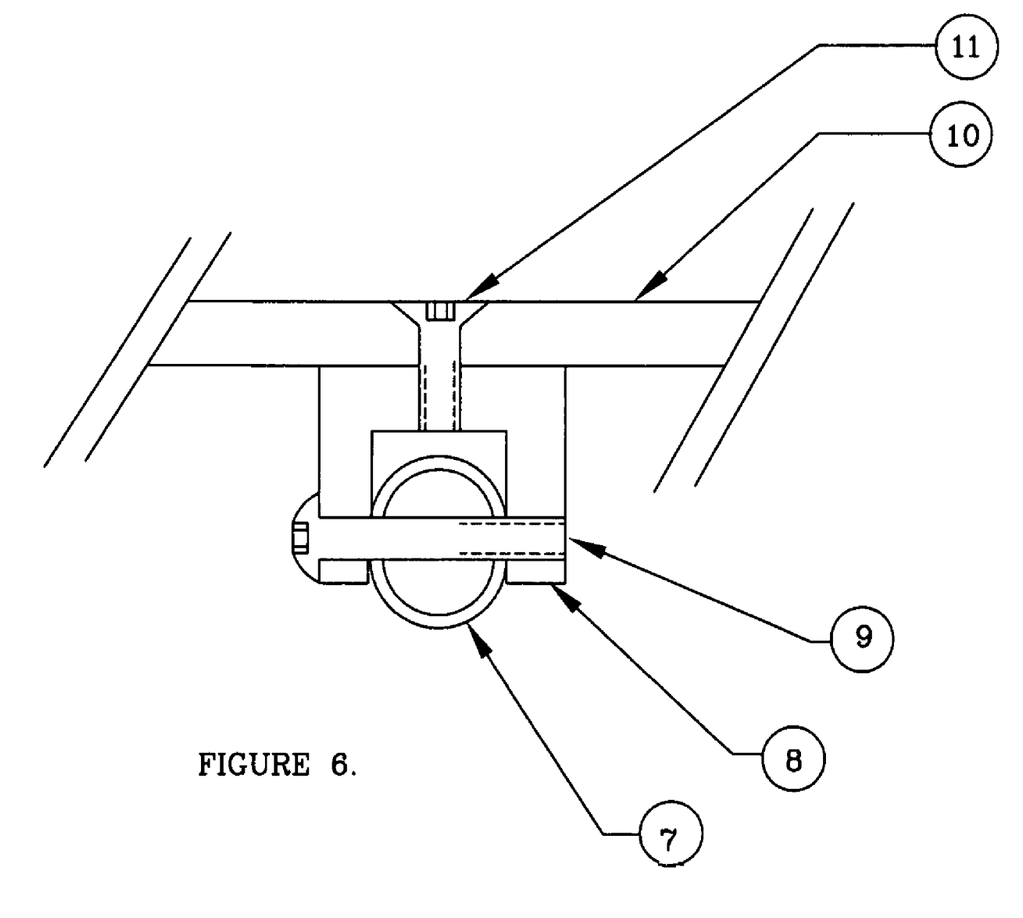
FIG. 6 shows a section view B-B as called out from FIG. 1.

As seen in FIGS. 1, 5 and 6, at the end of the cantilevered arm (6) is a unique pivoting hub (8). This hub is attached to the cantilevered arm (6) via a conventional screw (9) such that tightening the screw clamps the hub onto the cantilevered arm increasing pivot friction. This friction is used to allow lateral tilting of the table (10). Lateral tilt of the hub about screw (9) is limited by the shape of the hub such that the hub contacts the arm (6) before excessive lateral tilt of the table (10) is achieved.

The hub is preferably provided with pivot stops which limit the pivot angle range between said hub and said arm.

Table (10)

As seen in FIGS. 1, 2, 3, 5 and 6, attached to the pivoting hub (8) via a conventional pivot screw (11) is the table(10) Pivot screw(11) is tightened such that it provides some rotational friction to the table. The pivot screw and hub are conventionally configured such that the pivot screw does not tighten or loosen when the table is rotated about the screw and hub. As devices such as laptop or notebook computers have an offset center of gravity it may be desirable to offset the pivot screw as seen in FIG. 2 to achieve proper tilt performance. Polycarbonate or acrylic plastics work well for the table material, however any material of adequate strength may be used. Screw in rubber coated fingers (12) or other form of conventional fence or hold down may be used to help secure the supported item (13) on the movable table.

The tray's rotational attachment to the hub preferably comprises a flat head screw and wherein tightening the screw adjusts the rotational friction between said tray and said hub and is used with an anti-rotation means to prevent the flat head screw from rotating in normal use.

Shelf (14)

Figure 7:
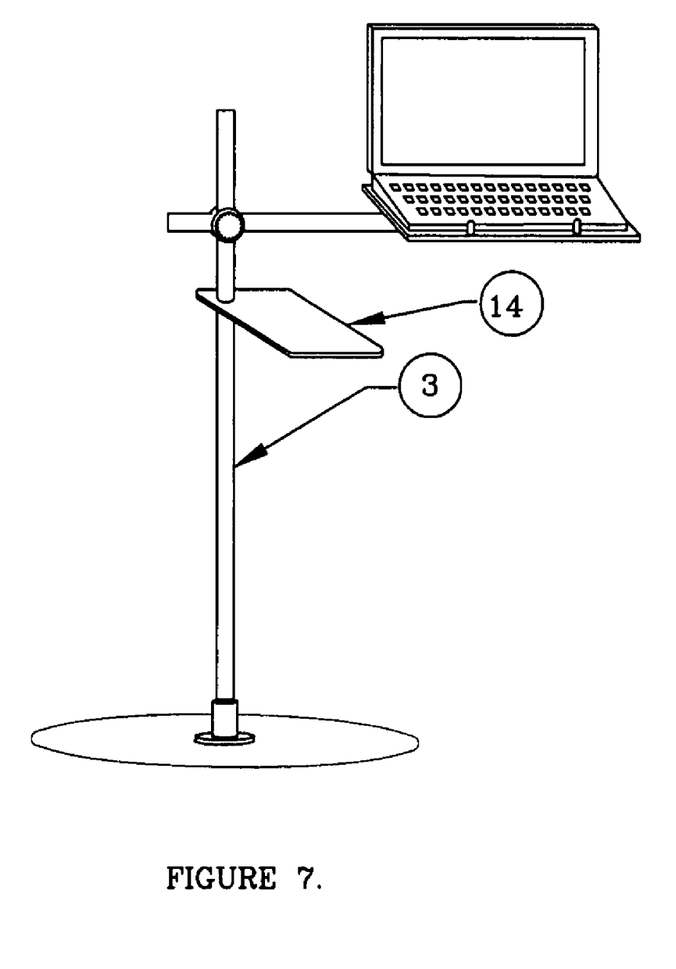
FIG. 7 shows an isometric view of the devise with a typical accessory shelf mounted.

As seen in FIG. 7. The mast (3) is a uniquely suited to support conventional accessories such as shelves(14), cup holders, lamp, note holders, mouse pad holders, etc. A close fit between the mast (3) and a cantilevered accessory provides a secure and readily adjustable mount. As may be seen, such accessories may be pivoted around the mast as well as vertically adjusted in position. On non-cantilevered accessories, a conventional shaft collar and thumb screw clamp arrangement may be desirable.

Base Handle (15)

Optionally, a handle may be cut into the base sheet for added portability, ease handling in manufacture and to provide hang points for painting processes.

Vehicle Seat Mounted Platform (16)

Figure 8:
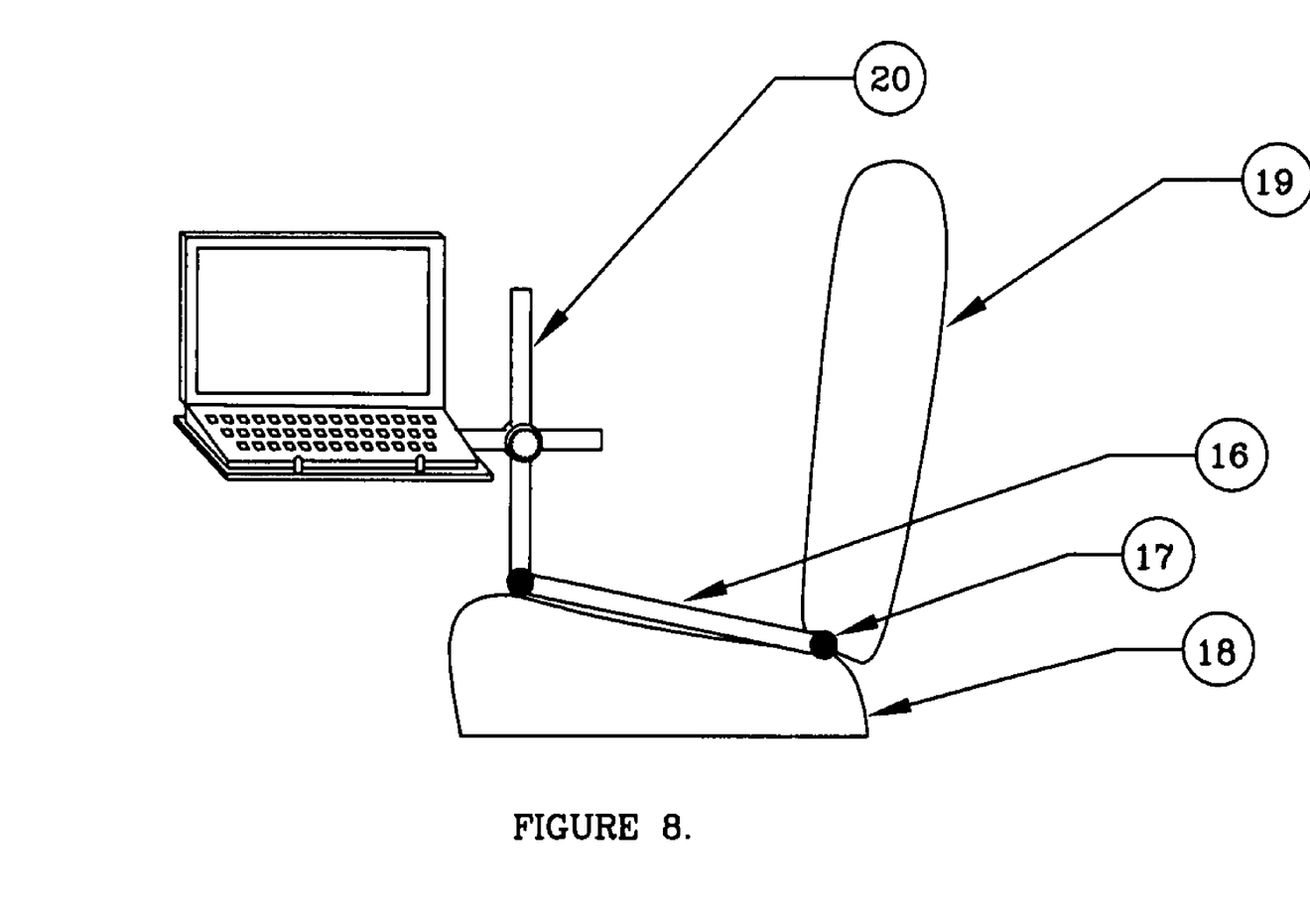
FIG. 8 shows a side view of the vehicle seat mount.

As seen in FIG. 8, a unique seat mounted base (16) is fitted with rounded rubber like corners (17) such that the back of the frame may be clamped between the bottom seat cushion (18) and back seat cushion (19) of a vehicle thus providing a secure platform in the vehicle. Tilting the seat back, setting the frame on the seat bottom, then tilting seatback upright again provides a convenient clamping technique for firmly and quickly installing the platform.

Vehicle AirDesk Mast (20)

Figure 9:
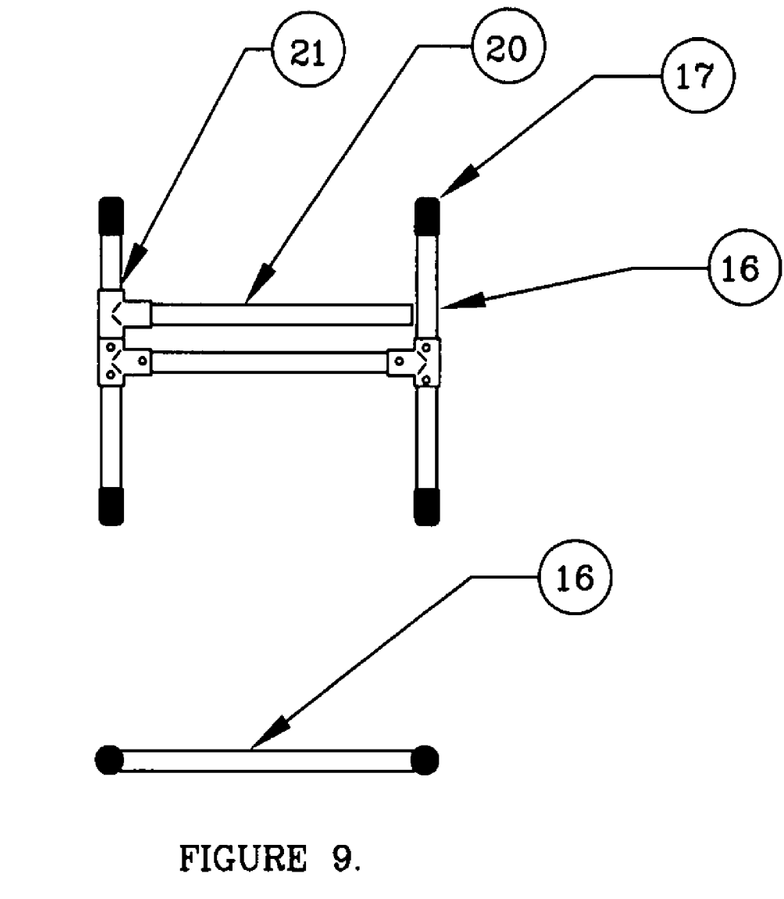
FIG. 9 shows a top view and side view of the vehicle seat mount frame in the folded or stored position.

As seen in FIGS. 8 and 9, a cantilevered mast (20) may be attached to vehicle seat mounted platform (16) for the purpose of attaching aforementioned accessories such as cross fitting, arm, hub and table assembly and shelf or accessory items. For portability the mast may be removed using conventional quick release means or it may pivot flat using conventional hinge (21) means as depicted in FIG. 9. When upright, conventional rotation locking means such as a pin or setscrew is provided to position said mast approximately upright.

Figure 10:
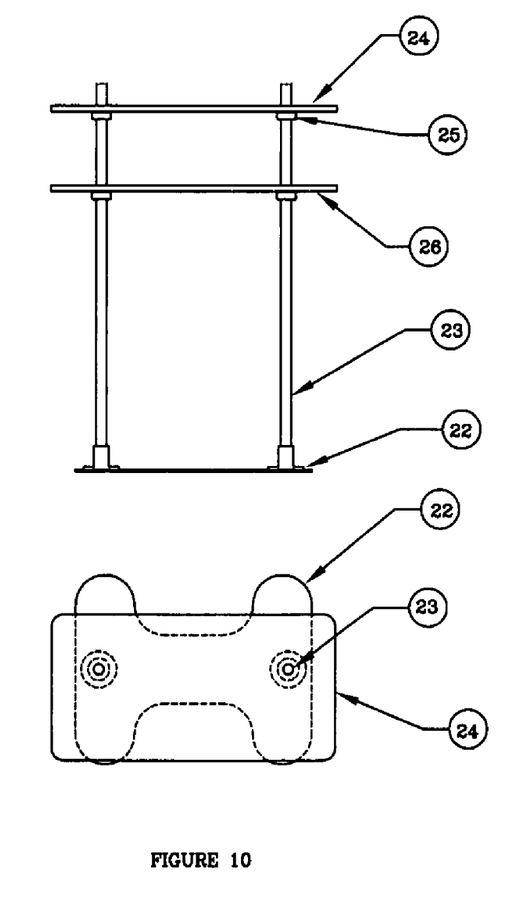
FIG. 10 shows front and top views of the bipod table and shelf configuration.

Bipod Table FIG. 10.

As seen in FIG. 10, the unique AirDesk base (22) may be configured for two masts (23). The dog bone shape of the base that is shown offers good structural rigidity low weight and offers efficient ganging for computerized laser cutting from standard sheet stock. One or more shelves (24) span the uprights and may be height positioned by conventional shaft collar locking means (25).

Bipod Workstation FIG. 10.

Also as seen in FIG. 10, a second shelf (26) may be added for keyboard and mouse positioning and shelf (24) provides support for a conventional computer monitor. Both shelves are height adjustable for user comfort. This configuration provides an extremely compact, space-saving, portable and attractive solution.

Figure 11:
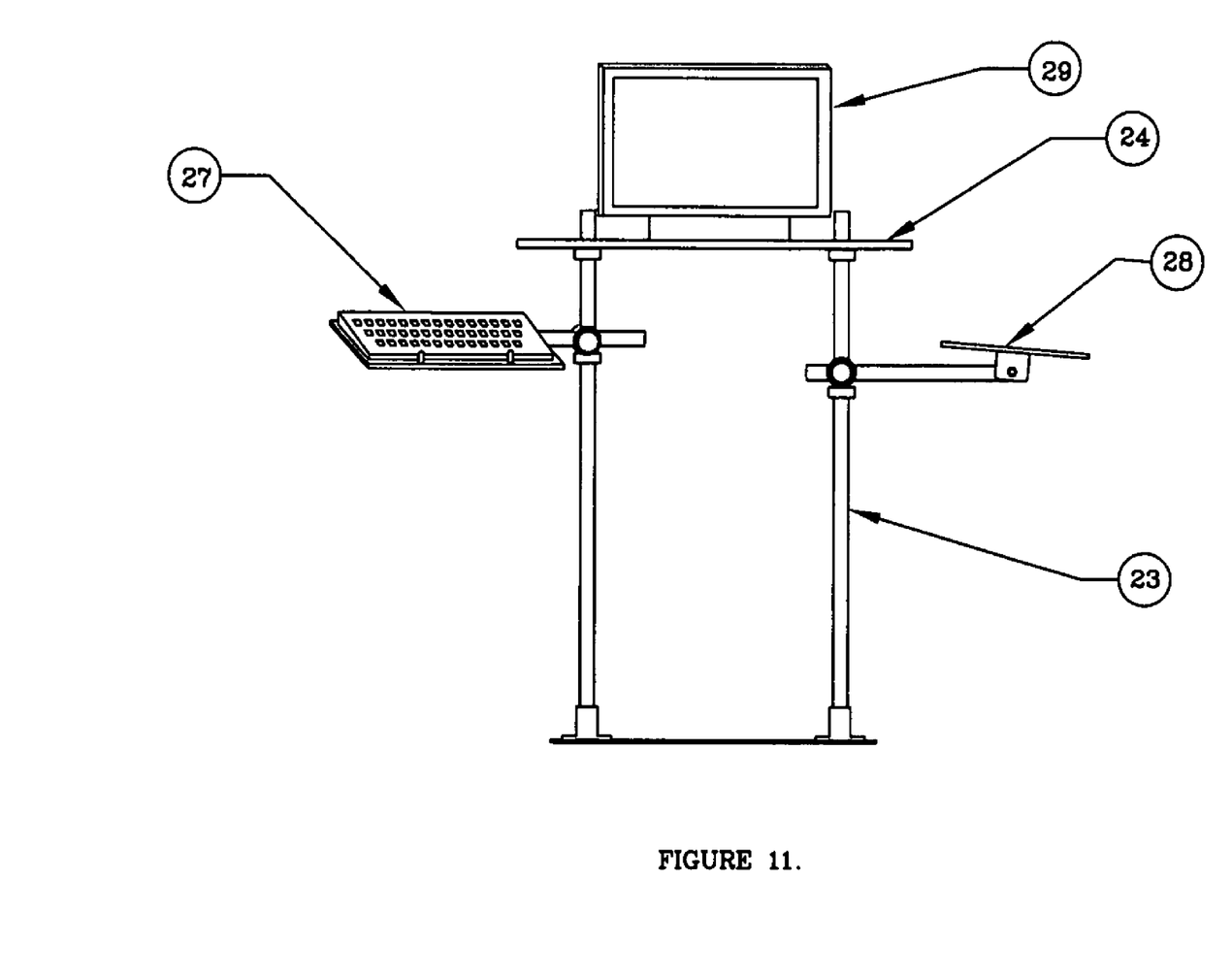
FIG. 11 shows a front view of the bipod configuration with two 6 axis positionable trays for keyboard and mouse or joystick style devices. Trays are pushed aside for clarity.

Bipod Workstation with 6 Axis Mouse and Keyboard Positioning. FIG. 11.

As seen in FIG. 11, AirDesk 6 axis positionable trays may be installed on the bipod masts(23) one for keyboard(27) and one mouse(28) allowing both keyboard and mouse or joystick type devices to be independently positioned in 6 axis for optimal user comfort. Keyboard and mouse trays can swing away for chair access or swing under the monitor shelf for compact storage. Also as seen, shelf (24) supports a conventional monitor (29) and is height adjustable for viewing comfort. Additional shelves may be added as needed and as space permits.

Figure 12:
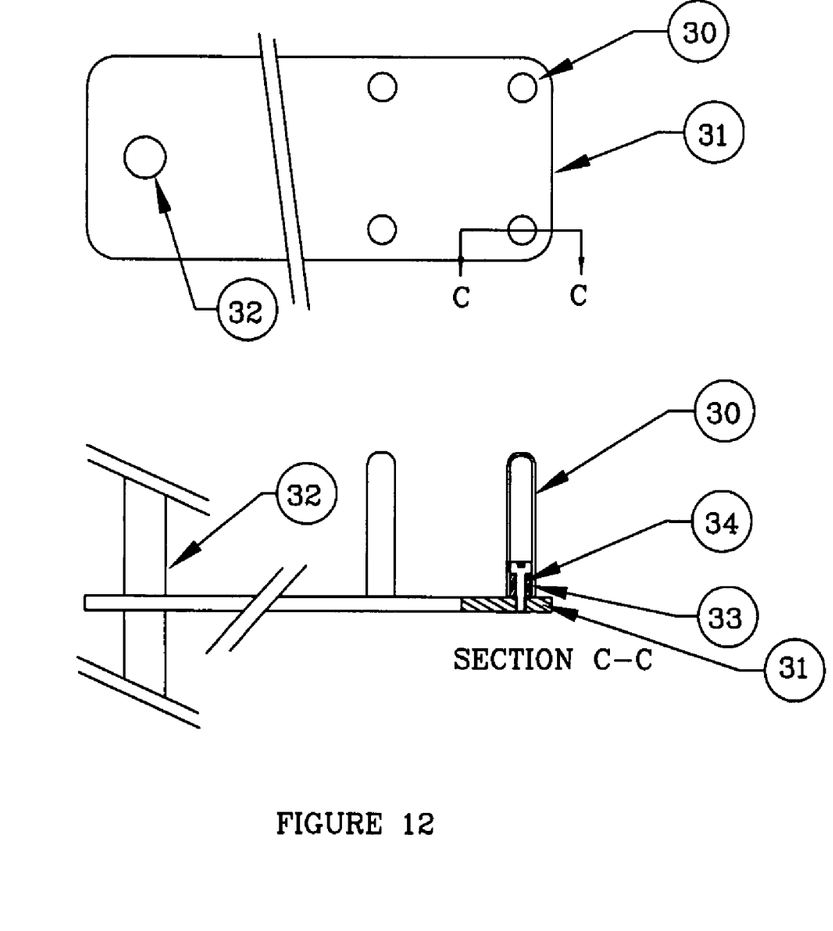
FIG. 12 shows a top view, side view and partial cross-section view of the cup holder accessory.

Cup Holder Accessory FIG. 12)

A unique cup holder consisting of 4 or more flexible and approximately upright soft plastic or rubber fingers(30) mounted on a flat base or shelf (31) as shown in FIG. 12. The shelf may be mounted to an upright mast (32) as previously described. For good performance it has been experimentally determined that a center to center finger mounting diameter of approximately 4" (100 mm) with an outside finger diameter of approximately 0.5" (13 mm) provides excellent container variation tolerance. Fingers flex to adapt to larger containers while acting like a fence to horizontally restrain smaller containers such as a 12 oz soda can. Finger length (height) can be varied to meet the application with a height of 3" (75 mm) being well suited for holding any soda can, cup or mug in vehicular use. For clarity, a sleeve (33) and screw (34) finger mount is shown however other conventional finger mounting configurations exist.

Figure 13:
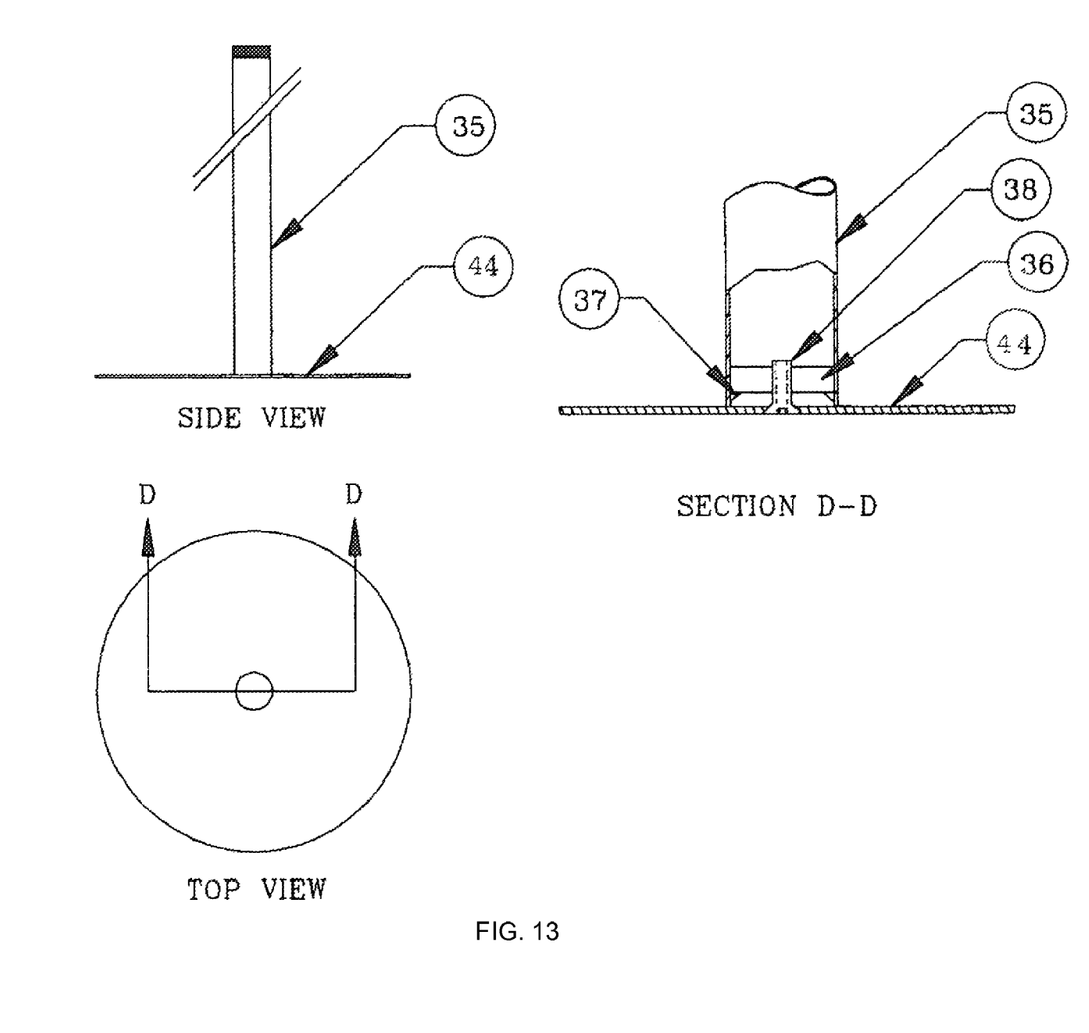
FIG. 13 Shows a top view, front view and partial cross section view of the stanchion base.

Portable Stanchion Base FIG. 13)

A unique portable stanchion apparatus consists of a base sheet (44), typically but not necessarily a disk shape, an elongated upright member (35), typically but not necessarily of tubular construction and intermediate fastener(s) (36, 38) and weld element 37. Unlike prior art movable stanchion base disks, this one is of solid sheet metal stock and is less than 0.31" (8 mm) thick.

The thickness range of 0.09 inches (2.3 mm) to 0.13 inches (3.4 mm) has been experimentally determined to provide both adequate stiffness and traffic compatibility for applications such as queue control. The base sheet is typically made of laser cut steel sheet for appearance, cost, and weight reasons.

Many traditional methods exist for attaching the stanchion mast to said base. Optionally the mast may be hollow and may be partially or fully filled with solid, loose or liquid ballast to increase tip resistance. Conventional stanchion top accessories are not shown.

Multiple Interlocking Bases

Multiple stanchion bases may be interlocked using mating dovetail or similar interlocking base profiles to readily assemble large semi-permanent stanchion barrier patterns as may be desirable in large scale queues.

Multiple Masts Mounted on a Single Base Sheet.

Two or more stanchion masts may be fitted to a single base to achieve fixed mast to mast distance as may be used for a queue entry or exit or to create a foundation structure for shelf table or desk applications. Again, the unique base sheet is thin enough not to present a trip hazard or an obstacle to wheels.

The invention claimed is:

1. A 6-axis, tray positioning device comprising:
a substantially vertical cylindrically shaped mast;
an arm provided with a substantially oval, "D" shape, square, or elliptical cross-section;
a cross-fitting comprising at least two holes at a substantially right angle to each other and which connects said arm to said mast in overlap fashion at a substantially right angle and which allows said arm to be positioned longitudinally and radially relative to said mast;
said arm fits into said cross-fitting such that the major dimension of the arm's cross-section is a slip fit with a mating cross-fitting hole;
a hand-screw provided in said cross-fitting and oriented at substantially a right angle to said arm for the purpose of adjustably engaging said arm;
said hand-screw adjusts the rotational angle limits and friction of said arm within said cross-fitting;
said arm, cross-fitting and hand-screw are sized to provide desired tray tilt limits about said arm and tilt angle adjustment of a tray within said tilt limits;
a hub pivotally attached to one end of said arm through a hole in said arm by a pivot-screw such that pivot friction between said hub and said arm is adjustable by varying the tightness of said pivot-screw;
a tray rotationally attached to said hub such that the tray may be rotated 360 degrees about said hub.

2. The 6-axis tray positioning device as described in claim 1 wherein said device further comprises a base to which is attached to and provides support for said mast; said base comprising of a substantially flat, substantially thin, substantially constant thickness and substantially round or polygonal sheet of adequate size and weight to support said device.

3. The 6-axis tray positioning device as described in claim 2 where a hand adjustable screw clamp is provided in said cross fitting to adjust friction between said cross-fitting and said mast.

4. The 6-axis tray positioning device as described in claim 3 where a support collar is secured to said mast and under said cross-fitting for user positioning height of said cross-fitting on said mast.

5. The 6-axis tray positioning device as described in claim 2 wherein said base comprises a handle shape through cut into the profile for added portability and ease of handling.

6. The 6-axis tray positioning device as described in claim 1 wherein said tray utilizes fingers for the purpose of retaining supported items.

7. The 6-axis tray positioning device as described in claim 1 wherein said tray is used to support a notebook computer, laptop computer, projector, camera, tablet computer, gps, or computer keyboard to achieve ergonomic and space economy benefits.

8. The 6-axis tray positioning device as described in claim 1 where one or more specialized accessories selected from the group consisting of shelves, cup holders, note holders, and lamps are mounted on said mast.

9. The 6-axis tray positioning device as described in claim 1 wherein said mast is supported by an adjustable angle hinge, locking hinge, quick release fitting, screw in fitting, or retaining pin fitting.

10. The 6-axis, tray positioning device of claim 1 wherein said device further comprises a base sheet to which is attached to and provides support for said mast.

11. The 6-axis, tray positioning device of claim 1 wherein said mast is provided by a vehicle mounted structure.

12. The 6-axis, tray positioning device of claim 1 wherein said mast is provided by a foldable frame that is supported by and is secured to a vehicle seat.

13. The 6-axis, tray positioning device of claim 1 wherein said mast is provided by a frame that is supported by and secured to a vehicle seat by wedging, clamping, or otherwise restraining the back of the frame between the seat back and seat bottom.

14. The 6-axis, tray positioning device of claim 12 wherein said frame may be folded flat for storage.

15. The 6-axis tray positioning device as described in claim 1 wherein said hub is provided with pivot stops which limit the pivot angle range between said hub and said arm.

16. The 6-axis tray positioning device as described in claim 1 wherein said tray's rotational attachment to said hub comprises a flat head screw and wherein tightening said screw adjusts the rotational friction between said tray and said hub; anti-rotation means to prevent said flat head screw from rotating in normal use.

17. The 6-axis, tray positioning device of claim 16 further comprising a setscrew in said hub to engage said flat head screw to prevent rotation of said flat head screw during normal use.

* * * * *